United States Patent
Sakata et al.

(10) Patent No.: US 10,334,965 B2
(45) Date of Patent: Jul. 2, 2019

(54) MONITORING DEVICE, MONITORING SYSTEM, AND MONITORING METHOD

(71) Applicant: PANASONIC INTELLECTUAL PROPERTY MANAGEMENT CO., LTD., Osaka (JP)

(72) Inventors: Yoshifumi Sakata, Tokyo (JP); Yuichiro Takemoto, Kanagawa (JP); Kazuhiko Iwai, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 156 days.

(21) Appl. No.: 15/515,747

(22) PCT Filed: Oct. 27, 2015

(86) PCT No.: PCT/JP2015/005373
§ 371 (c)(1),
(2) Date: Mar. 30, 2017

(87) PCT Pub. No.: WO2016/084305
PCT Pub. Date: Jun. 2, 2016

(65) Prior Publication Data
US 2017/0295953 A1    Oct. 19, 2017

(30) Foreign Application Priority Data
Nov. 26, 2014   (JP) .................. 2014-238621

(51) Int. Cl.
*G06K 9/00* (2006.01)
*A47F 5/00* (2006.01)
(Continued)

(52) U.S. Cl.
CPC ............... *A47F 3/002* (2013.01); *A47F 5/00* (2013.01); *A47F 10/02* (2013.01);
(Continued)

(58) Field of Classification Search
CPC ....... G06K 9/00771; G06K 2009/00738; G06K 9/3241; G06Q 10/087
See application file for complete search history.

(56) References Cited

U.S. PATENT DOCUMENTS 8,873,794 B2 * 10/2014 Sorensen ........... G06K 9/00771
                                                       382/100
2002/0057840 A1 * 5/2002 Belmares ......... G08B 13/19602
                                                       382/218
(Continued)

FOREIGN PATENT DOCUMENTS

JP            5-81552      4/1993
JP        2002-135644      5/2002
(Continued)

OTHER PUBLICATIONS

International Search Report issued in International Patent Application No. PCT/JP2015/005373, dated Jan. 26, 2016.

*Primary Examiner* — Utpal D Shah
(74) *Attorney, Agent, or Firm* — Greenblum & Bernstein, P.L.C.

(57) ABSTRACT

A monitoring device includes a fixed area setter that sets an area of a part of a display shelf to be monitored as a fixed area, based on a captured image of the display shelf in a store, a shelf detector that detects the display shelf, by determining a similarity between an image of the fixed area set by the fixed area setter and an image at the same position as the fixed area, from the captured image of the store, and an alert notifier that notifies a user that the display shelf to be monitored is not detected, when it is determined that there is no similarity.

16 Claims, 14 Drawing Sheets

(51) Int. Cl.
*A47F 3/00* (2006.01)
*G06Q 10/08* (2012.01)
*G06Q 30/06* (2012.01)
*A47F 10/02* (2006.01)

(52) U.S. Cl.
CPC ....... *G06K 9/00771* (2013.01); *G06Q 10/087*
(2013.01); *G06Q 30/06* (2013.01); *A47F*
*2010/025* (2013.01); *G06K 2009/00738*
(2013.01)

(56) References Cited

U.S. PATENT DOCUMENTS

2016/0364966 A1* 12/2016 Dixon .............. G08B 13/19606
2016/0366348 A1* 12/2016 Dixon ................. H04N 5/2354

FOREIGN PATENT DOCUMENTS

| | | |
|---|---|---|
| JP | 2002-366621 | 12/2002 |
| JP | 3908047 | 4/2007 |
| JP | 2012-242912 | 12/2012 |
| WO | 2013/175837 | 11/2013 |

\* cited by examiner

| RECORD NO | SHELF NUMBER | IMAGE AT SETTING TIME | SETTING DATE AND TIME | FIXED AREA INFORMATION |
|---|---|---|---|---|
| 1 | 001 | tana1.jpg | 2014/10/4 12:05 | {308,103},{344,104},{324,617},{287,615} |
| 2 | 001 | tana1.jpg | 2014/10/4 12:06 | {808,106},{850,111},{824,627},{781,627} |
| 3 | 002 | tana2.jpg | 2014/10/5 10:15 | {xxx,yyy},{xxx,yyy},{xxx,yyy},{xxx,yyy} |

71 72 73 74

MONITORING DEVICE, MONITORING SYSTEM, AND MONITORING METHOD

TECHNICAL FIELD

The present invention relates to a monitoring device, a monitoring system, and a monitoring method, which monitor a display shelf based on a captured image of a store.

BACKGROUND ART

In stores such as convenience stores, a sales opportunity loss occurs if there is a defect in the display state of goods displayed on display shelves, that is, the display of goods is disturbed or there is a shortage of goods, and this sales opportunity loss gives a big influence on the sales of the store. Therefore, after checking whether or not there is a defect in the display state of goods by monitoring the display shelf, in case of having a defect, it is necessary to promptly implement a goods management work (an arranging work or a replenishing work) to resolve the defect.

As a technique relating to such a goods management work, in the related art, a technique is known which determines necessity of replenishment of goods, based on a captured image of a display area and makes a notification instructing a replenishing work (see PTL 1). Further, a technique is known which generates information on a display method of goods or a shortage of goods, based on a captured image of a display area and transmitting the information to the terminal in a head office (see PTL 2). Further, a technique is known which determines necessity of arranging goods based on a captured image of a display area and makes a notification instructing an arranging work (see PTL 3).

CITATION LIST

Patent Literature

PTL 1: Japanese Patent Unexamined Publication No. 5-081552
PTL 2: Japanese Patent Unexamined Publication No. 2002-366621
PTL 3: Japanese Patent No. 3908047

SUMMARY OF THE INVENTION

A monitoring device according to the present invention is configured to include a fixed area setter that sets an area of a part of a display shelf to be monitored as a fixed area, based on a captured image of the display shelf in a store, a shelf detector that detects the display shelf, by determining a similarity between an image of the fixed area set by the fixed area setter and an image at the same position as the fixed area in a captured image of the store, and an alert notifier that notifies a user that the display shelf to be monitored is not detected, when it is determined that there is no similarity.

DESCRIPTION OF EMBODIMENT

Figure 1:
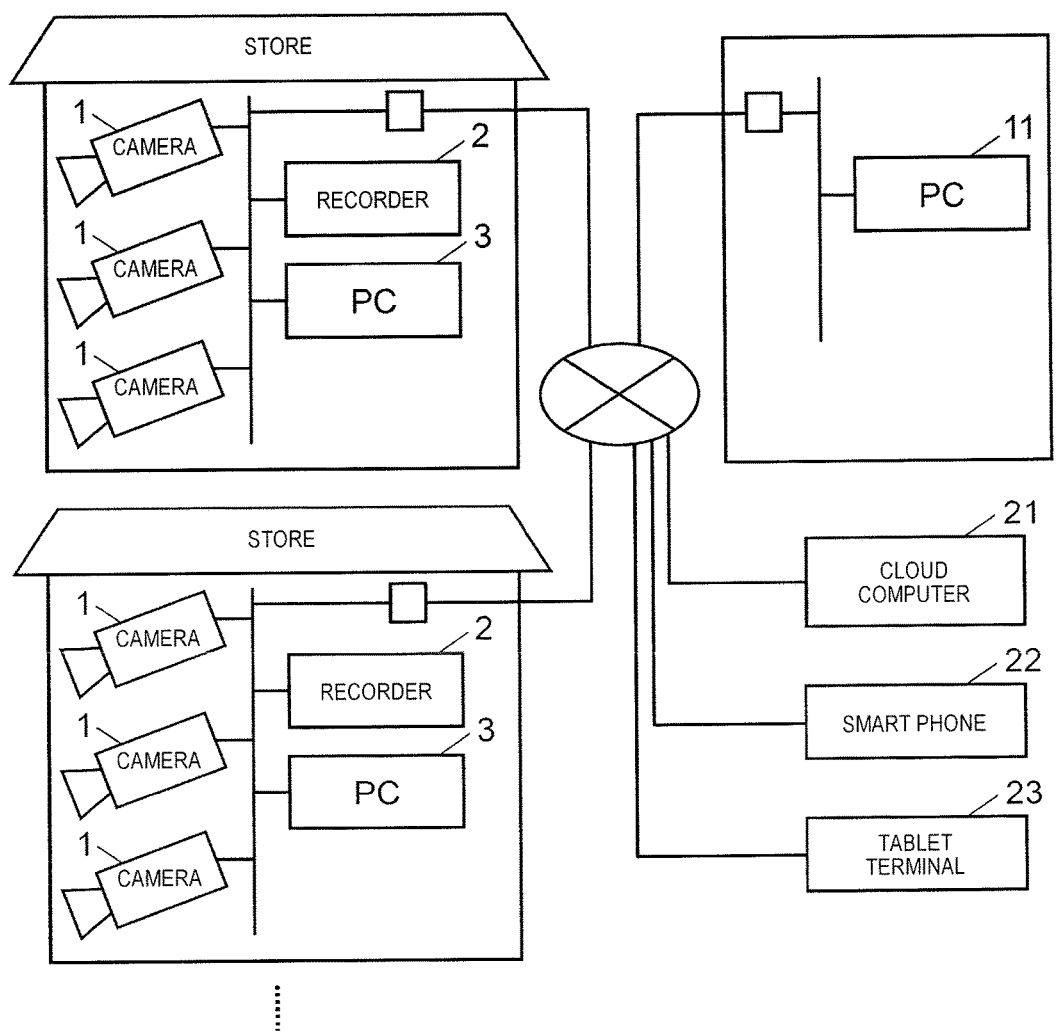
FIG. 1 is an overall configuration diagram of a monitoring system according to a present embodiment.

Prior to the description of the embodiments of the present invention, a brief description will be given on problems in the related art. In the related art, it is possible to monitor the display status of goods in the display area, and instruct a store staff member to perform a goods management work (an arranging work or a replenishing work) as necessary, but in a case where there is a shift in the position of a camera and the store staff member moves the display shelf to a different location, there is a problem that incorrect image data is continuously monitored and it is not possible to properly monitor the display status of goods.

A first aspect of the invention which is made to solve the above problem is configured to include a fixed area setter that sets an area of a part of a display shelf to be monitored as a fixed area, based on a captured image of the display shelf in a store, a shelf detector that detects the display shelf, by determining a similarity between an image of the fixed area set by the fixed area setter and an image at the same position as the fixed area in a captured image of the store, and an alert notifier that notifies a user that the display shelf to be monitored is not detected, when it is determined that there is no similarity.

According to this, a portion of the display shelf where an image is not to be changed is registered, if the portion (fixed area) changes, it is possible to notify the store staff member of the occurrence of abnormality in the monitoring environment such as a change in the position of the display shelf, thereby preventing useless monitoring of a place without a display shelf from being continued.

A second aspect of the invention is configured such that the shelf detector extracts an area without a change over a predetermined period as a fixed area candidate, from the captured image of the store, and the fixed area setter sets an area selected by the user as the fixed area, from among the extracted fixed area candidates.

According to this, since areas without an image change are presented to a store staff member and the fixed area is selected from among the areas, it is possible to easily set the fixed area.

A third aspect of the invention is configured such that the fixed area setter stores position information of the area set as the fixed area, a captured image of the display shelf at a setting time, and an identifier of the display shelf in a storage.

According to this, since the position of the fixed area and an image at a setting time are stored for each display shelf, they can be compared with the current captured state at any time.

A fourth aspect of the invention is configured such that the fixed area setter sets a plurality of areas as a plurality of the fixed areas, the shelf detector determines similarity between an image at each of the plurality of fixed area and an image at the same position as each of the plurality of fixed areas, and the alert notifier notifies the user that the display shelf is not detected when it is determined that at least one of the plurality of fixed areas is not similar.

According to this, since it is possible to set a plurality of areas without an image change for a single display shelf as a fixed area, it is possible to reliably recognize the change of the monitoring environment of the display shelf.

A fifth aspect of the invention is configured such that the shelf detector determines a similarity by comparing brightness of the image of the fixed area with brightness of the image at the same position as the fixed area.

According to this, it is possible to perform accurate determination as to a similar image, based on the color and the brightness of the captured image.

A sixth aspect of the invention is configured so as to further include an automatic tracker that when the shelf detector determines that an image of the fixed area is not similar to an image at the same position as the fixed area, searches for a similar image which is similar to the image of the fixed area, from the captured image of the store, and controls an angle of view of a camera which is capturing an image such that the position of the searched similar image is the position of the fixed area, and the alert notifier notifies the user that the display shelf is not detected when the similar image cannot be searched.

According to this, even if the position of the fixed area deviates from that at the setting time, if there is the same image as the fixed area in the captured image, the photographing direction of the camera is changed so that the fixed area is located at the position at the time of the original setting, even if the position of the display shelf is changed, the camera tracks the change, and thus monitoring can be continued without taking the trouble of the store staff member.

A seventh aspect of the invention is configured so as to further include a shelf detector that detects a display shelf, by searching for a marking image which is attached to the display shelf and uniquely identifiable, from a captured image of the display shelf in a store, and determining whether or not a position of the searched marking image matches an initial position of the marking image which is stored in advance, an automatic tracker that controls an angle of view of a camera which is capturing an image such that the position of the marking image is the initial position, when the shelf detector determines that the position of the marking image does not match the initial position, and an alert notifier that notifies a user that the display shelf is not detected, when the shelf detector is not able to search for the marking image.

According to this, a seal having a unique pattern or the like is pasted as a marking on a part of the display shelf, it is possible to easily search the display shelf by searching for this marking, and furthermore, even if the position of the marking deviates from the initial position due to the movement of the display shelf or the like, the user changes the photographing direction of the camera so as to come to the initial position by viewing the marking from the captured image, so that even if the position of the display shelf is changed, the camera tracks the change, and thus monitoring can be continued without taking the trouble of the store staff member.

An eighth aspect of the invention is configured so as to further include a goods detector that detects goods from the display shelf detected by the shelf detector, and a display screen generator that generates a monitoring screen for displaying the detection result of goods and the captured image of the display shelf on a monitor.

According to this, since goods displayed in the shelf are detected after the position of the display shelf is clearly recognized, it is possible to correctly monitor the display status of goods.

A ninth aspect of the invention is a monitoring system which monitors a display shelf, based on a captured image of the display shelf in a store, and is configured to include a camera that captures the display shelf, and an information processing device, and the information processing device includes a fixed area setter that sets an area of a part of the display shelf to be monitored as a fixed area, based on a captured image of the display shelf in the store, a shelf detector that detects the display shelf, by determining a similarity between an image of the fixed area set by the fixed area setter and an image at the same position as the fixed area from the captured image of the store, and an alert notifier that notifies a user that the display shelf to be monitored is not detected, when it is determined that there is no similarity.

According to this, a portion of the display shelf where an image is not to be changed is registered, and if the portion (fixed area) changes, it is possible to notify the store staff member of the occurrence of abnormality in the monitoring environment such as a change in the position of the display shelf, thereby preventing useless monitoring of a place without a display shelf from being continued.

A tenth aspect of the invention is a monitoring method causing an information processing device to implement a process of monitoring a display shelf, based on a captured image of the display shelf in a store, and is configured to include setting an area of a part of the display shelf to be monitored as a fixed area, from the captured image of the display shelf, and determining a similarity between an image of the set fixed area and an image at the same position as the fixed area, from a captured image of the store, and notifying a user that the display shelf to be monitored is not detected, when it is determined that there is no similarity.

According to this, a portion of the display shelf where an image is not to be changed is registered, and if the portion (fixed area) changes, it is possible to notify the store staff member of the occurrence of abnormality in the monitoring environment such as a change in the position of the display shelf, thereby preventing useless monitoring of a place without a display shelf from being continued.

(Embodiment 1)

Hereinafter, embodiments of the present invention will be described with reference to the drawings.

FIG. 1 is an overall configuration diagram of a monitoring system according to the present embodiment. This monitoring system is constructed for retail chain stores such as convenience stores, and includes camera 1, recorder (image storage device) 2, and PC (information processing device) 3, which are provided at each of a plurality of stores, PC 11 provided at a head office that generalizes the plurality of stores, cloud computer 21 that constitutes a cloud computing system provided on the network, smart phone 22 or tablet terminal 23 that can receive an alert notifications at any place.

Cameras 1 are installed at appropriate locations in a store to capture an interior of the store, and images obtained thereby are recorded by recorder 2. PC 3 installed in a store and PC 11 installed in the head office can display the image of the interior of the store captured by camera 1 in real time, and display the past images of the interior of the store recorded in recorder 2, and this allows a user at the store or the head office to check the situation in the store.

PC 11 installed in the head office constructed as a facility management support device that supports the business of a supervisor who manages the store. Further, the information generated by PC 11 can be viewed by the supervisor on the monitor of PC 11, and the information is sent to PC 3 installed in a store and can be viewed by a store manager or the like even in PC 3. In this way, PC 3 and PC 11 are configured as a browsing device. Smart phone 22 or tablet terminals 23 can be configured as a browsing device.

Figure 2:
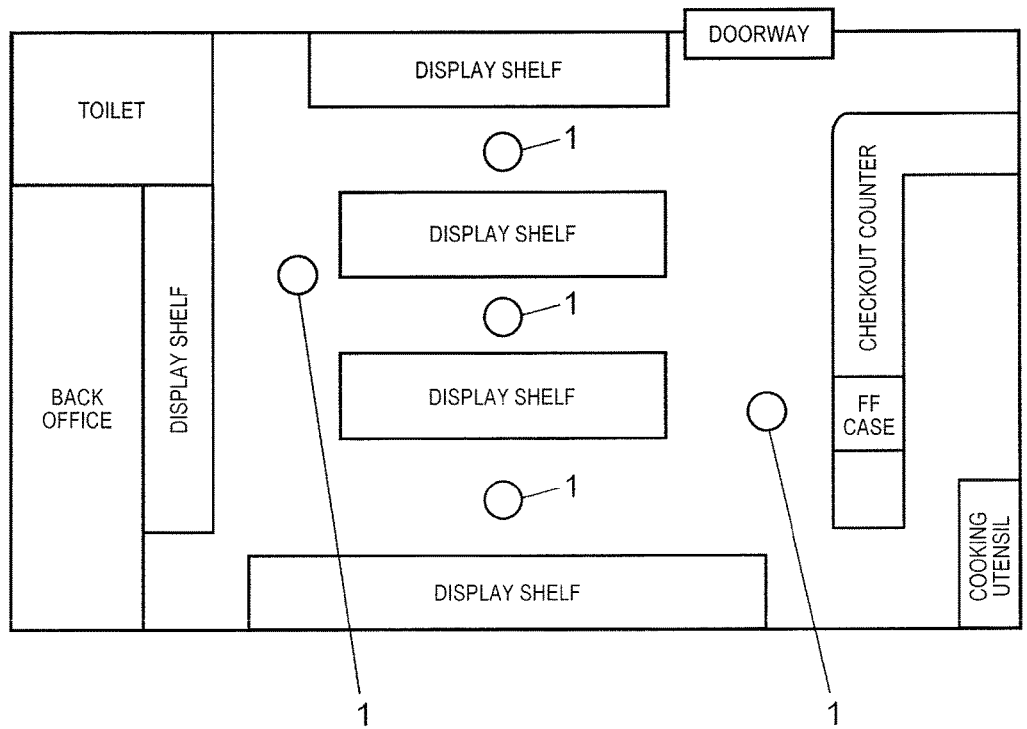
FIG. 2 is a plan view of a store illustrating a layout of a store and an installation state of cameras 1.

Next, a layout of a store and an installation status of cameras 1 will be described, with a convenience store as an example. FIG. 2 is a plan view of a store illustrating a layout of a store and an installation state of camera 1.

The store includes a doorway, display shelves, checkout counters, cooking utensils, and the like. The display shelves are set up for respective types of goods, such as fast food, rice (goods such as rice balls, lunch boxes, and sushi), processed foods, miscellaneous goods, fresh foods, magazines, newspapers and the like. Cooking utensils are used to cook fast food such as fried chicken in the store, and display shelves for fast food (FF case) are arranged next to the checkout counter. A customer enters the store through the doorway, moves in the store through passages between the display shelves, and when a desired good is found, goes to the checkout counter with the good, and makes payment (pays for the good) at the checkout counter before exiting the store through the doorway.

In addition, a plurality of cameras 1 which take images of the interior of a store are installed in the store. Cameras are installed at appropriate positions on the ceiling in the store. In particular, in the example illustrated in FIG. 2, an omnidirectional camera having a photographing range of 360 degrees using a fisheye lens is used as camera 1, and goods displayed on the display shelves or the like, people entering and leaving the store from the doorway, people staying in the store, and the like can be captured by camera 1.

Figure 3:
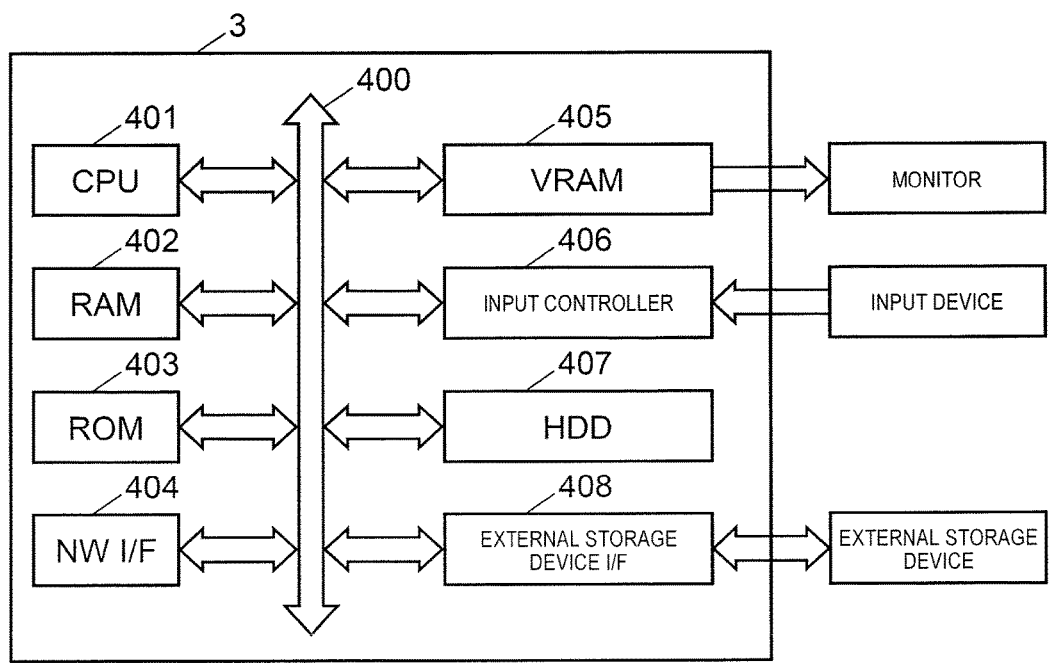
FIG. 3 is a hardware block diagram of PC 3 according to a first embodiment.

Next, FIG. 3 is a hardware block diagram of PC 3 (information processing device) that is installed in a store. PC 3 includes bus 400 for connecting respective units, central processing unit (CPU) 401 that controls the computer system, random access memory (RAM) 402, read only memory (ROM) 403 that stores programs, being executed by a CPU, for realizing operation processing procedures and respective functional configurations of the monitoring device, network interface (NW I/F) 404 that performs data transfer with external devices through a network, video RAM (VRAM) 405 for displaying image information on a monitor, input controller 406 that controls input signals input from an input device including a keyboard, a pointing device, and the like, hard disk drive (HDD) 407, and external storage device interface 408 that controls the input and output from an external storage device.

Figure 4:
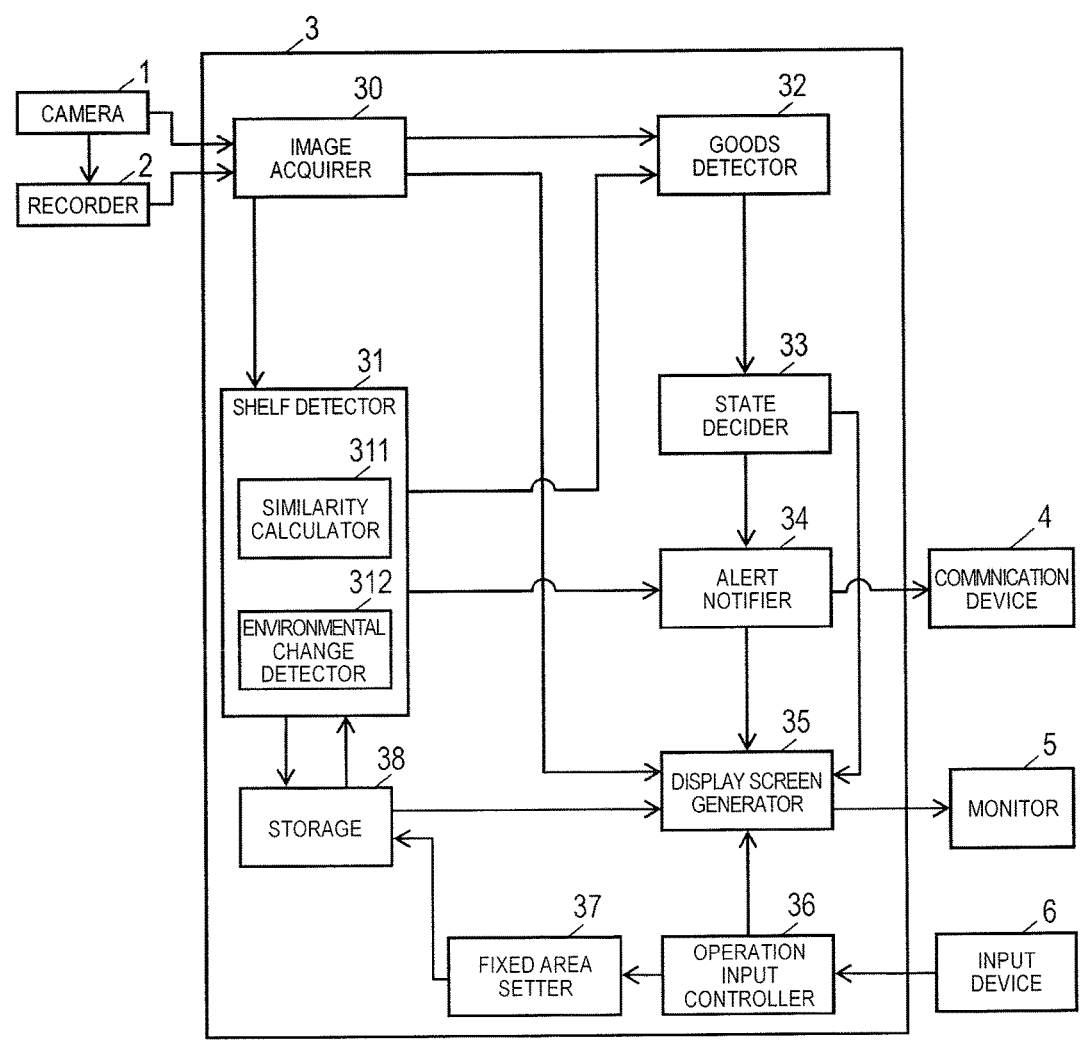
FIG. 4 is a functional block diagram illustrating a schematic configuration of PC 3 according to the first embodiment.

Next, FIG. 4 is a functional block diagram illustrating a schematic configuration of PC 3 in stalled in a store. PC 3 includes image acquirer 30 that acquires images from camera 1 or recorder 2, shelf detector 31 that detects a display shelf from the acquired image, goods detector 32 that detects goods from the detected display shelf images, state decider 33 that determines a display state (display amount, display disturbance, or the like) according to the detection result of goods, alert notifier 34 that notifies an alert in a case where it is determined that the position of the display shelf is shifted or in a case where it is determined that there is a defect in the display state, display screen generator 35 that generates a screen for displaying alert contents on monitor 5 upon receiving an alert notification, operation input controller 36 that controls an operation input from input device 6, fixed area setter 37 that sets a part of the image of the display shelf as a fixed area, and storage 38 that stores the management information of the display shelf including the fixed area.

Each functional configuration illustrated in FIG. 4 is achieved by controlling each hardware by CPU 401 illustrated in FIG. 3 executing the programs stored in ROM 403. These programs may be configured as a dedicated device which is previously introduced into PC 3 which is the information processing device. It may also be recorded in an appropriate program recording medium as an application program operating on a general purpose OS. Further, it may be provided to the user through a network. In addition, PC 11 also has the same configuration as that of PC 3.

In FIG. 4, image acquirer 30 acquires captured images of the interior of a store from camera 1 and recorder 2. Here, when the captured images of the interior of the store are monitored on monitor 5, images are acquired from camera 1 in the case of displaying the image of the day in real time, and images are acquired from recorder 2 in the case of displaying the images for the past predetermined period.

Shelf detector 31 includes similarity calculator 311 and environmental change detector 312, and detects whether there is no change in the position of the display shelf on the image of the interior of the store. A change occurs in the position of the display shelf on the image, in a case where the display shelf is moved, an obstacle is placed between the display shelf and camera 1, or the left and right or the upper and lower imaging angle (angle of view) of camera 1 changes.

Similarity calculator 311 compares the image of the fixed area stored in advance as an area in which a change does not occur in the image of the display shelf with the image of the position corresponding to the fixed area on the current image and calculate a similarity.

Environmental change detector 312 compares the similarity calculated by similarity calculator 311 with a threshold to determine whether or not a change occurs in the fixed area portion on the image, and makes a notification to alert notifier 34 when there is a change. Here, if the similarity is high, it means that there is no change in the position of the display shelf. Conversely, if the similarity is low, it means that the display shelf is moved, or there is an obstacle between the display shelf and the camera, or an abnormality occurs in the monitoring environment of the display shelf such as that the angle of view of the camera has shifted.

In a case where environmental change detector 312 determines that the similarity is high, that is, there is no change in the position of the display shelf, goods detector 32 executes a process of detecting the goods displayed on the display shelf. The goods detection process is executed by a known method such as obtaining the ratio of pixels representing objects assumed to be goods to all pixels of the display shelf.

State decider 33 executes a process of comparing the detection result of goods detector 32 with the threshold, and determining whether or not there is a deficiency in the display shelf such as a small display amount.

In a case where environmental change detector 312 determines that there is an abnormality in the monitoring environment of the display shelf, alert notifier 34 executes a process of generating alert information for notifying the abnormality and notifying communication device 4 of it. Alert notifier 34 notifies display screen generator 35 of the alert information. Even in the case where state decider 33 determines that the display shelf is defective, alert notifier 34 notifies communication device 4 and display screen generator 35 of the alert information indicating the fact.

Display screen generator 35 executes a process of generating a monitoring screen used for the user to monitor the image of the store, and the generated monitoring screen is displayed on monitor 5. Display screen generator 35 also generates a display screen relating to a display amount shortage or a determination result of display disturbance by state decider 33, or alert information by alert notifier 34, and displays the screen on monitor 5.

Operation input controller 36 acquires input information, in response to an input operation performed by the user using input device 6 such as a mouse, a keyboard, and the like, on the screen displayed on monitor 5.

Fixed area setter 37 executes a process of setting in advance a part of the display shelf as a fixed area. Fixed area setter 37 stores the position information of an area (fixed area) of a part of a display shelf designated by the user using input device 6, an image (an image at the setting time) and setting date and time when this fixed area is set, in storage 38.

Storage 38 stores the image at a setting time, the setting date and time, and the position information of the fixed area received from fixed area setter 37 as shelf management information in association with the identifier of the display shelf to be monitored. Storage 38 also stores a threshold for comparing with a similarity.

Figure 5:
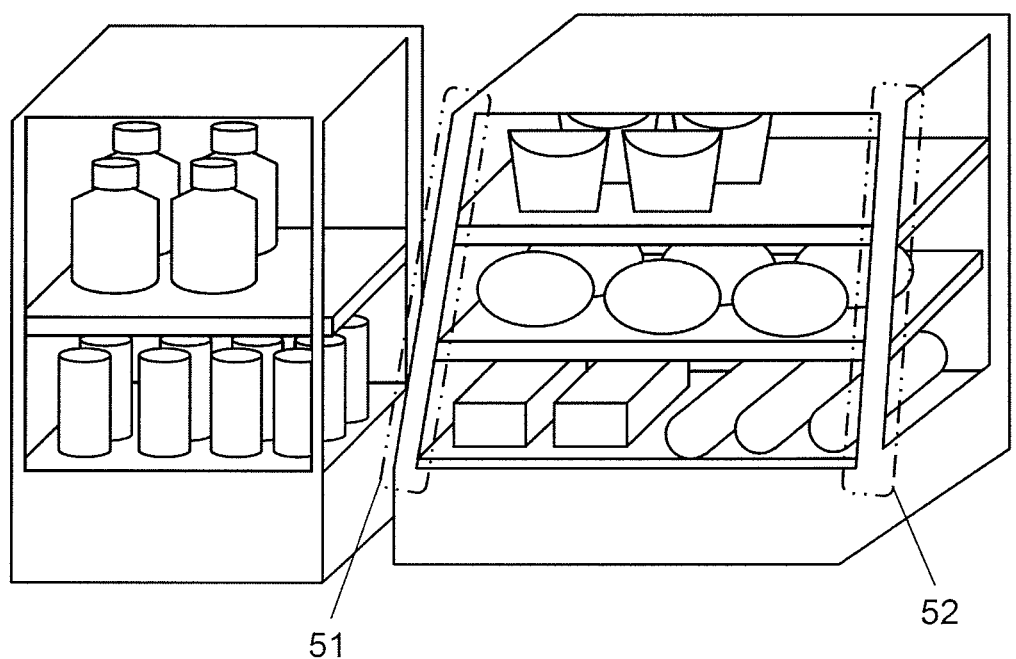
FIG. 5 is an explanatory diagram illustrating a fixed area which is set on an image of a display shelf according to the first embodiment.

FIG. 5 is an explanatory diagram illustrating a fixed area which is set on an image of a display shelf. As illustrated in FIG. 5, fixed area setter 37 sets and stores fixed area 51 and fixed area 52 from the image of the display shelf, in response to the input operation by the user using input device 6. It is assumed that an area on the display shelf where a change does not occur is designated as a fixed area, and here, fixed area 51 and fixed area 52 are designated as rectangular areas at one shelf frame and the other shelf frame of the display shelf, respectively. In this case, the image acquired by image acquirer 30 may be displayed on monitor 5, and the fixed area on monitor 5 may be designated and input by the user. The fixed area may be specified in a shape such as a triangle or pentagon instead of a rectangle. The position of the fixed area is denoted by the coordinates of three points in a case of specifying a triangle area, and is denoted by the coordinates of five points in a case of specifying a pentagon area.

Figure 6:
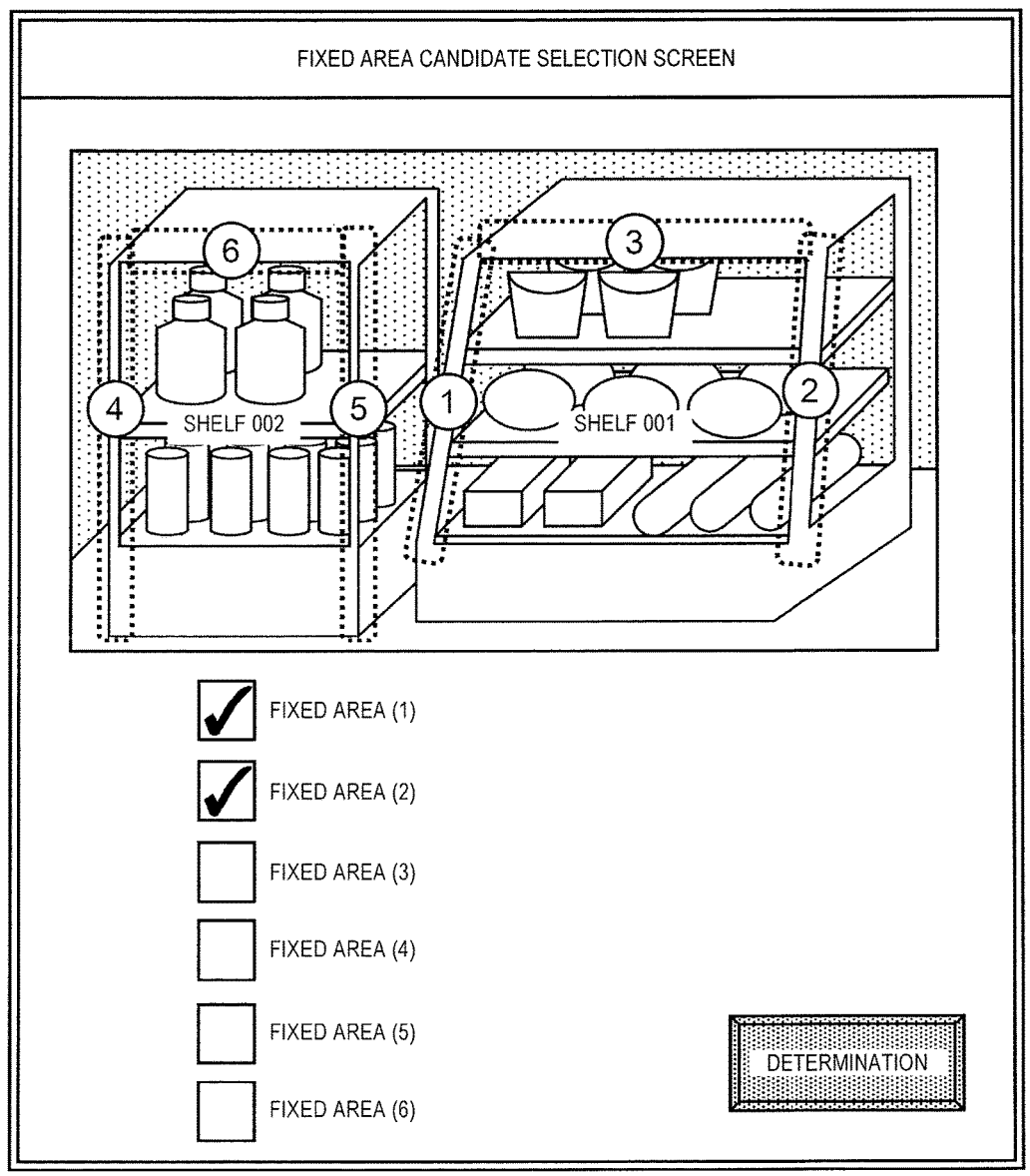
FIG. 6 is an explanatory diagram illustrating a fixed area candidate which is set on the image of the display shelf according to the first embodiment.

FIG. 6 is an explanatory diagram illustrating fixed area candidates which are set on the image of the display shelf. In FIG. 6, instead of inputting and setting the fixed area directly by the user as illustrated in FIG. 5, candidates for an area suitable for a fixed area from the image of the display area is presented to the user so that the user may select the fixed area from among these candidates. With respect to the candidates for the fixed area, shelf detector 31 extracts an area that has not changed for a certain period of time from the image acquired by image acquirer 30, and display screen generator 35 may generate a screen in which the candidate area of the fixed area is superimposed on the image of the store, as illustrated in FIG. 6. In the example illustrated in FIG. 6, there are two display shelves: shelf number 001 and shelf number 002 on the image, and fixed area (1) and fixed area (2) which are the left and right shelf frames of the shelf number 001 are selected as the fixed areas to be monitored of the shelf number 001, but the upper surface (fixed area (3)) of the shelf may be selected.

Figures 7, 8:
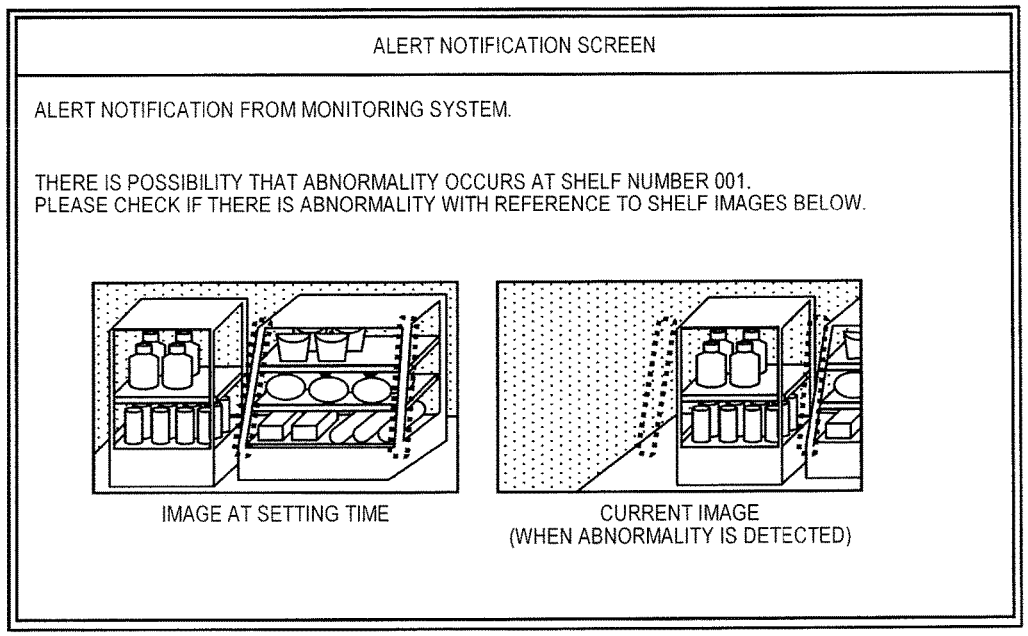
FIG. 7 is a diagram illustrating shelf management information according to the first embodiment.
FIG. 8 is an explanatory diagram illustrating an alert notification screen according to the first embodiment.

FIG. 7 is an explanatory diagram illustrating shelf management information stored by storage 38. Shelf management information contains image 72 at a setting time, setting date and time 73, fixed area information 74 which is the coordinate of the set fixed area, in association with identifier 71 (shelf number) of the display shelf where fixed area is set. In a case of a plurality of fixed areas is set in one display shelf, a plurality of records with the same shelf number may be stored. Alternatively, a plurality of pieces of fixed area information 74 may be provided, with one record for each shelf number.

In the example illustrated in FIG. 6 and FIG. 7, since two rectangular fixed area (1) and fixed area (2) are set for shelf number 001, fixed area information 74 of record No. 1 contains the coordinates of 4 points of fixed area (1) and fixed area information 74 of record No. 2 contains the coordinates of 4 points of fixed area (2). It is assumed that this shelf management information contains the file name of the image file as image 72 at a setting time and the actual image file is stored in a predetermined storage location in storage 38, but the storage location (path) and the file name may be stored as image 72 at a setting time.

FIG. 8 is an explanatory diagram illustrating an alert notification screen. In a case where environmental change detector 312 of shelf detector 31 determines that there is a change in the fixed area, alert notifier 34 sends alert information to display screen generator 35. Display screen generator 35 generates a display screen for alert notification as illustrated in FIG. 8, and displays it on monitor 5. In this alert notification screen, identifier 71 (shelf number) for identifying the display shelf read from the shelf management information stored in storage 38, image 72 at a setting time of this display shelf, and a current image are displayed side by side. In this way, a store staff member at a store or a supervisor at a head office can clearly recognize a display shelf having problems. Alert notifier 34 can also send the alert information as an e-mail to communication device 4 or another network device.

The shelf number and the image at a setting time displayed on the alert notification screen may be read from the shelf management information of storage 38 by display screen generator 35, or may be read from storage 38 and transmitted together with the determination result to alert notifier 34 by environmental change detector 312, and transmitted from alert notifier 34 to display screen generator 35. The setting date and time when the fixed area is set and the date and time when the current image is obtained may be displayed on the alert notification screen.

Figure 9:
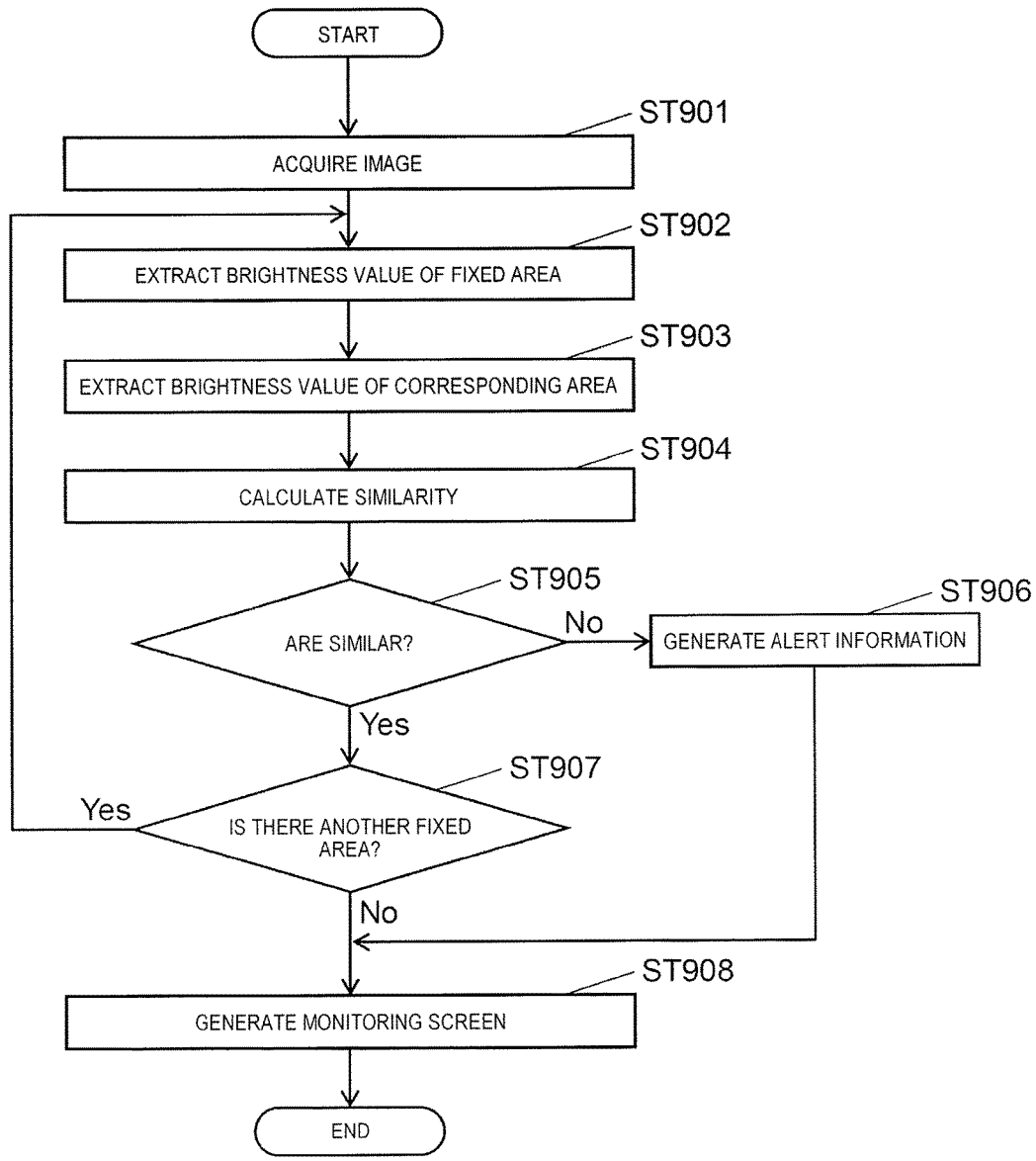
FIG. 9 is an operation flow chart illustrating a procedure of detecting position shift of the display shelf and makes a notification of an alert according to the first embodiment.
Figure 10:
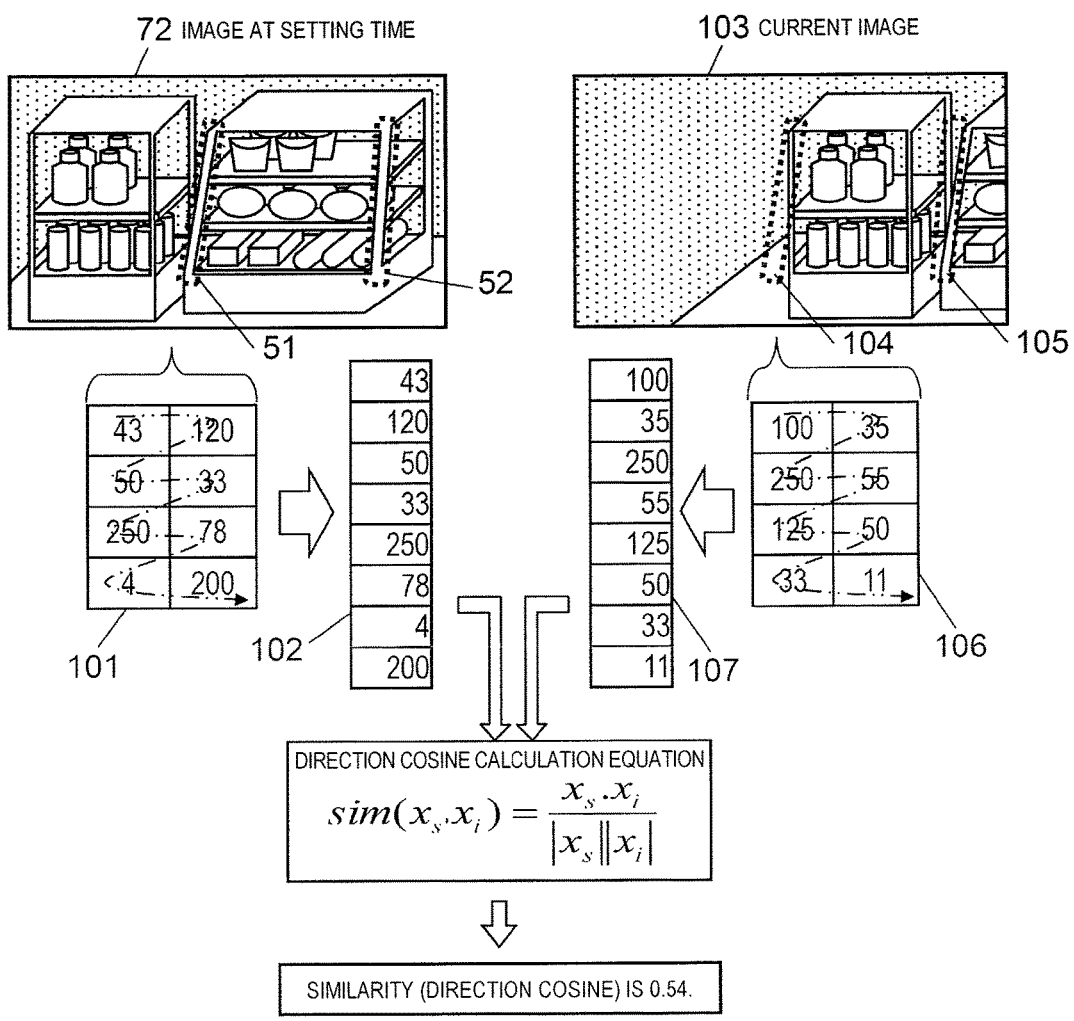
FIG. 10 is an explanatory diagram illustrating an example of calculating similarity from brightness values according to the first embodiment.

Next, a process performed by PC 3 will be described. FIG. 9 is an operation flow chart illustrating a procedure of detecting abnormality of the display shelf being monitored and makes a notification of an alert. FIG. 10 is an explanatory diagram illustrating an example of calculating similarity from the brightness of a fixed area.

In FIG. 9, PC 3 acquires captured images of the interior of a store from camera 1, by image acquirer 30 (ST901).

Next, similarity calculator 311 reads an image when the fixed area is set (image 72 at a setting time) and position information of the fixed area (fixed area information 74) from the shelf management information in storage 38, and extracts the brightness value of the image of the fixed area on the image at a setting time (ST902). In the example illustrated in FIG. 10, since two fixed areas 51 and 52 are set in the image 72 at a setting time, first, the brightness value of the image of the first fixed area 51 is extracted and the extracted brightness value 101 of fixed area 51 is converted into the brightness vector 102. The extraction of the brightness value and the conversion to the brightness vector are performed by a known method.

Subsequently, similarity calculator 311 extracts the brightness value of the image corresponding to fixed area 51 (fixed area corresponding image) from the current image acquired by image acquirer 30 (ST903). In the example illustrated in FIG. 10, the brightness value of fixed area corresponding image 104 at the position corresponding to fixed area 51 of current image 103 is extracted, and extracted brightness value 106 of fixed area corresponding image 104 is converted into brightness vector 107.

Since color and brightness vary depending on the time zone even for the same image, the brightness values of fixed area corresponding images 104 and 105 are extracted from the image at the same time zone as when setting the fixed area. In this case, setting date and time 73 of the shelf management information is used to select images in the same time zone. Since color and brightness also vary depending on the weather, the brightness values of fixed area corresponding images may be extracted from the image of the same weather as when setting the fixed area. In this case, information on the weather when setting the fixed area may be stored in the shelf management information or another storage area.

Next, similarity calculator 311 calculates similarity between brightness vector 102 of fixed area 51 and brightness vector 107 of fixed area corresponding image 104 (ST904). As a calculation method of a similarity, a known method such as a method using a direction cosine (inner product) or a method of measuring a distance between vectors is used. When using the direction cosine calculation equation illustrated in FIG. 10, the similarity between fixed area 51 and fixed area corresponding image 104 is 0.54.

Next, environmental change detector 312 compares the similarity calculated by similarity calculator 311 with a preset threshold, and according to the comparison result, and determines whether fixed area 51 and fixed area corresponding image 104 are similar or not (ST 905). For example, in a case where the threshold is set to 0.7, it is the threshold or less or less than it because the similarity calculated in the example illustrated in FIG. 9 is 0.54, and it is determined that the position of the display shelf has changed.

In a case where it is determined that there is no similarity (the position of the display shelf has changed) in ST905 (No in ST905), information indicating a change is notified from environmental change detector 312 to alert notifier 34, and alert information is generated by alert notifier 34 (ST906). This alert information is sent from alert notifier 34 to display screen generator 35. Display screen generator 35 generates an alert notification screen as illustrated in FIG. 8 based on the alert information (ST 908), and displays it on monitor 5. The alert information can be transmitted from alert notifier 34 to communication device 4 by an e-mail.

On the other hand, in a case where it is determined that they are similar (no change in the position of the display shelf) in ST905 (Yes in ST905), it is determined whether or not another fixed area is set, based on the contents of the shelf management information in storage 38 (ST907). Here, since there is another fixed areas 52 as illustrated in FIG. 10, and two records of records NO1 and NO2 are stored for the same shelf number 001 as illustrated in FIG. 7, it is determined that there is another fixed area (Yes in ST907), ST902 and the subsequent processes are repeated for fixed area 52 and fixed area corresponding image 105.

When all of the fixed areas are similar and there is no other fixed area for which similarity is to be determined (No in ST907), display screen generator 35 generates a monitoring screen for monitoring the images of the display shelf and displays it on monitor 5.

As described above, according to the first embodiment, a fixed area is set on the image of the display shelf to be monitored, and a user is notified of an alert when there is an abnormality such as a shift in the position of at least one fixed area, such that it is possible to prevent the monitoring the display shelf from being continued while the monitoring environment has changed.

(Embodiment 2)

Figure 11:
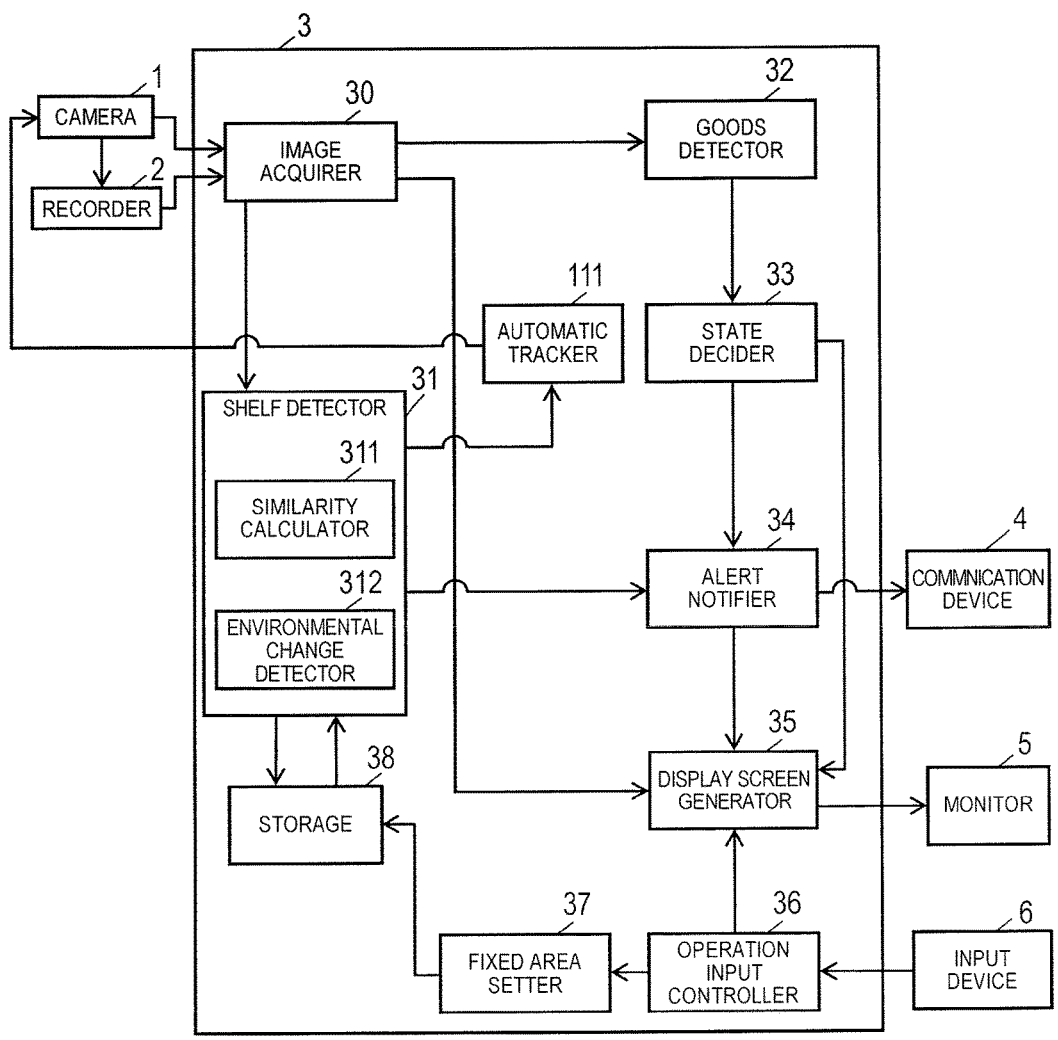
FIG. 11 is a functional block diagram illustrating a schematic configuration of PC 3 according to a second embodiment.

FIG. 11 is a functional block diagram illustrating a schematic configuration of PC 3 according to a second embodiment. In the second embodiment, in a case where the position of the fixed area is different from the position at a setting time registered in the shelf management information, shelf detector 31 searches for the image of the fixed area from the image, and automatic tracker 111 controls the angle of view of camera 1 so that the searched image of the fixed area becomes the position at the original setting. Hereinafter, in the description of the second embodiment, redundant explanation may be omitted for substantially the same configuration as in the first embodiment.

Figure 12:
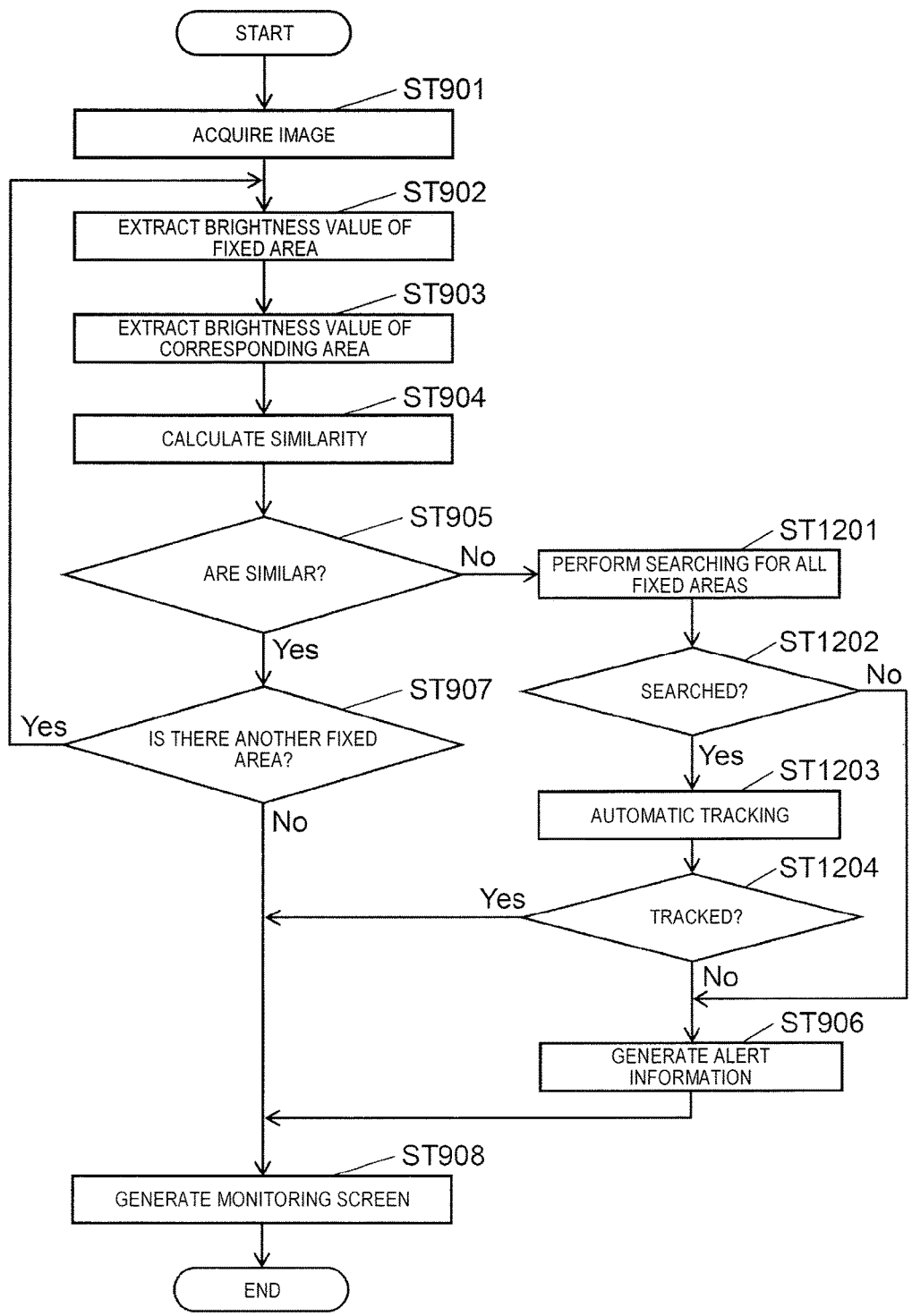
FIG. 12 is an operation flow diagram illustrating an operating procedure of automatic tracking according to the second embodiment.

FIG. 12 is an operation flow diagram illustrating an operating procedure of automatic tracking according to the second embodiment. In FIG. 12, the process from ST901 to ST905 is as described above. In a case where it is determined that there is no similarity (the position of the display shelf has changed) in the determination of ST905 (No in ST905), shelf detector 31 searches for an image having brightness similar to that of fixed area 51, in an area having the same shape and size of those of fixed area 51, from current image 103 (see FIG. 10) (ST 1201). In a case where a plurality of fixed areas are set, searching is performed for all fixed areas.

Next, in a case where the images of all fixed areas can be searched (Yes in ST1202), the position information of the searched current fixed area and the position information of the fixed area at a time of setting the original fixed area (fixed area information 74 of shelf management information) are sent from shelf detector 31 to automatic tracker 111. Automatic tracker 111 performs automatic tracking for controlling the up, down, left and right directions of (angle of view) of camera 1 so that the searched position of the fixed area becomes the position of the fixed area at a setting time, on the image (ST1203). The angle of view of the camera required to change the position of the searched current fixed area to the position of the fixed area at the time of setting the original fixed area (fixed area information 74 of the shelf management information) may be notified from shelf detector 31 to automatic tracker 111. In this case, it is assumed that automatic tracker 111 controls camera 1 based on the notified angle of view.

Next, when the automatic tracking cannot be performed without controlling the angle of view of the camera (No in ST1204), or when the fixed area cannot be searched in ST 1202 (No in ST1202), this fact is notified to alert notifier 34, and alert notifier 34 generates alert information (ST906). In other words, an alert notification screen notifying that the angle of view of the camera cannot be controlled, or an alert notification screen notifying that the fixed area cannot be searched from the current image is generated. When the angle of view of the camera is controlled and the automatic tracking is performed in ST1204 (Yes in ST1204), a monitoring screen of a display shelf that captures a fixed area at the position as stored in the shelf management information is generated (ST 908).

As described above, according to the second embodiment, even in a case where there is a shift in the position of the fixed area which is set in the display shelf due to the movement of the display shelf, the photographing direction is changed by controlling the camera so as to return the position of the fixed area after the shift to the position at a time of setting an original fixed area. Thus, even in a case where the display shelf is actually moved or even in a case where the angle of view of the capturing camera has changed, the position of the display shelf can be accurately captured, and the monitoring will be continued without bothering the user.

In the second embodiment, the automatic tracking is performed by changing the photographing direction of the camera, but instead of changing the photographing direction of the camera, the latest position of the display shelf may be recognized based on the position of the fixed area on the current image, and goods may be detected from among them. In that case, automatic tracker 111 may inform goods detector 32 of the moved position of the display shelf. Thus, even in a case where the display shelf moves in the image, it is possible to accurately detect goods from the moved display shelf, without troubling the user.

(Embodiment 3)

Figure 13:
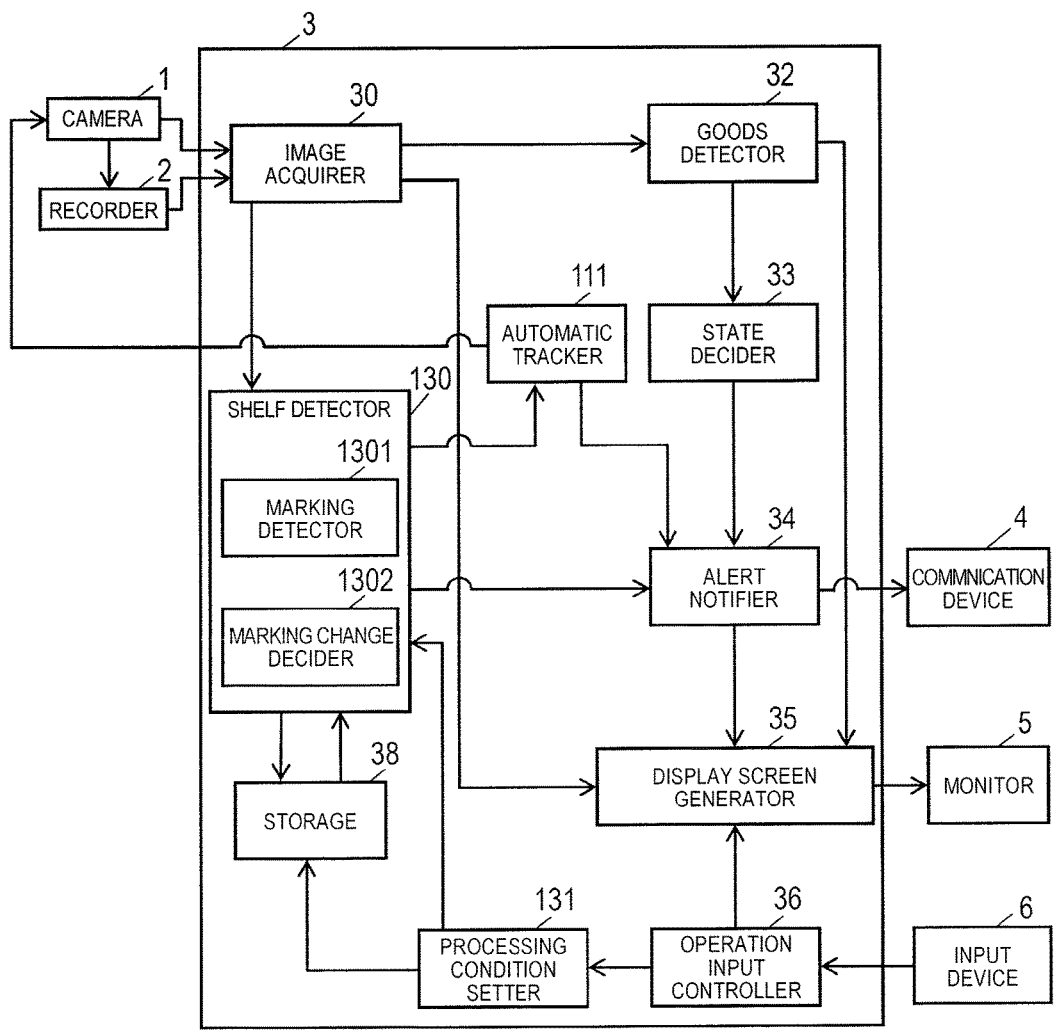
FIG. 13 is a functional block diagram illustrating a schematic configuration of PC 3 according to a third embodiment.

FIG. 13 is a functional block diagram illustrating a schematic configuration of PC 3 according to a third embodiment. In the third embodiment, marking is added to the display shelf in advance, shelf detector 130 searches for a marking image in the image, and automatic tracker 111 controls an angle of view of camera 1 such that the position of the searched marking image is the initial position. Hereinafter, in the description of the third embodiment, redundant explanation may be omitted for substantially the same configuration as in the first and second embodiments.

Figure 14:
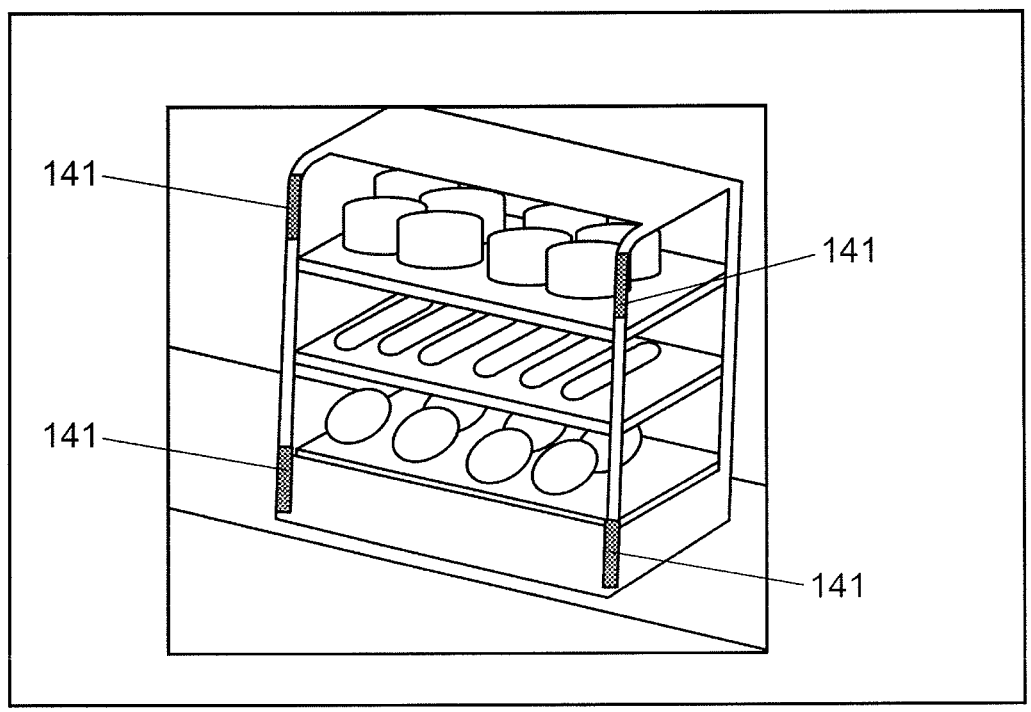
FIG. 14 is an explanatory diagram illustrating a marking attached to a display shelf according to the third embodiment.

FIG. 14 is an explanatory diagram illustrating a marking attached to a display shelf according to the third embodiment. As illustrated in FIG. 14, seals which are uniquely identifiable without being confused with others are attached to exposed portions of the display shelf which can be captured at all times, without being hidden by goods or other display items, and these are markings 141. In the example illustrated in FIG. 14, markings 141 are placed at a total of four places of the left and right parts respectively on the upper side and the lower side of the display shelf, but as long as it is possible to specify the area of the display shelf, the marking may be changed as appropriate. For example, a total of three places of the upper left and right part and one lower part, or a total of two places of an upper right part and a lower left part may be used.

As illustrated in FIG. 13, shelf detector 130 includes marking detector 1301 and marking change decider 1302, and further includes processing condition setter 131. Marking detector 1301 detects marking 141 added on the display shelf from the image input from image acquirer 30 and sends the position information of the detected marking 141 to marking change decider 1302. If marking 141 cannot be detected from the image, alert notifier 34 is notified that marking cannot be detected. Thus, alert notifier 34 is able to promptly inform the user of abnormality of the display shelf, by displaying an alert notification screen on monitor 5 through display screen generator 35 or sending an alert notification to communication device 4.

Marking change decider 1302 determines whether or not the position information of the marking obtained from marking detector 1301 has changed from the initial position of the marking stored in storage 38. When the marking position has changed from the initial position (there is a shift in the position of the display shelf), the position information of the detected marking and the position information of the initial position of the marking are notified to automatic tracker 111. Marking change decider 1302 may notify the automatic tracker 111 of the information on the angle of view derived from both pieces of position information, instead of the position information.

Automatic tracker 111 controls an angle of view of a camera such that the position of the searched marking image is the initial position of the marking. Thus, if marking 141 on the image can be detected even if the display shelf is moved a little, goods detector 32 can recognize the area where goods are to be detected and accurately detect the goods.

Processing condition setter 131 sets processing conditions which are set and input by the user using input device 6 and stores them in storage 38. First, the user gives an instruction to search for the display shelf using marking 141 according to the third embodiment. At that time, an image of marking 141 added to the display shelf and the position information (initial position) of each marking 141 are input. Processing condition setter 131 stores these input processing conditions in storage 38.

Regarding the input of the position information (initial position) of each marking 141, marking detector 1301 is instructed to detect the positions of all the markings 141 from the image, and this position information may be stored in storage 38 as the initial position information of marking 141. When marking change decider 1302 determines a change in the marking position, the detected marking position and the initial position information (initial marking position) are compared.

Figure 15:
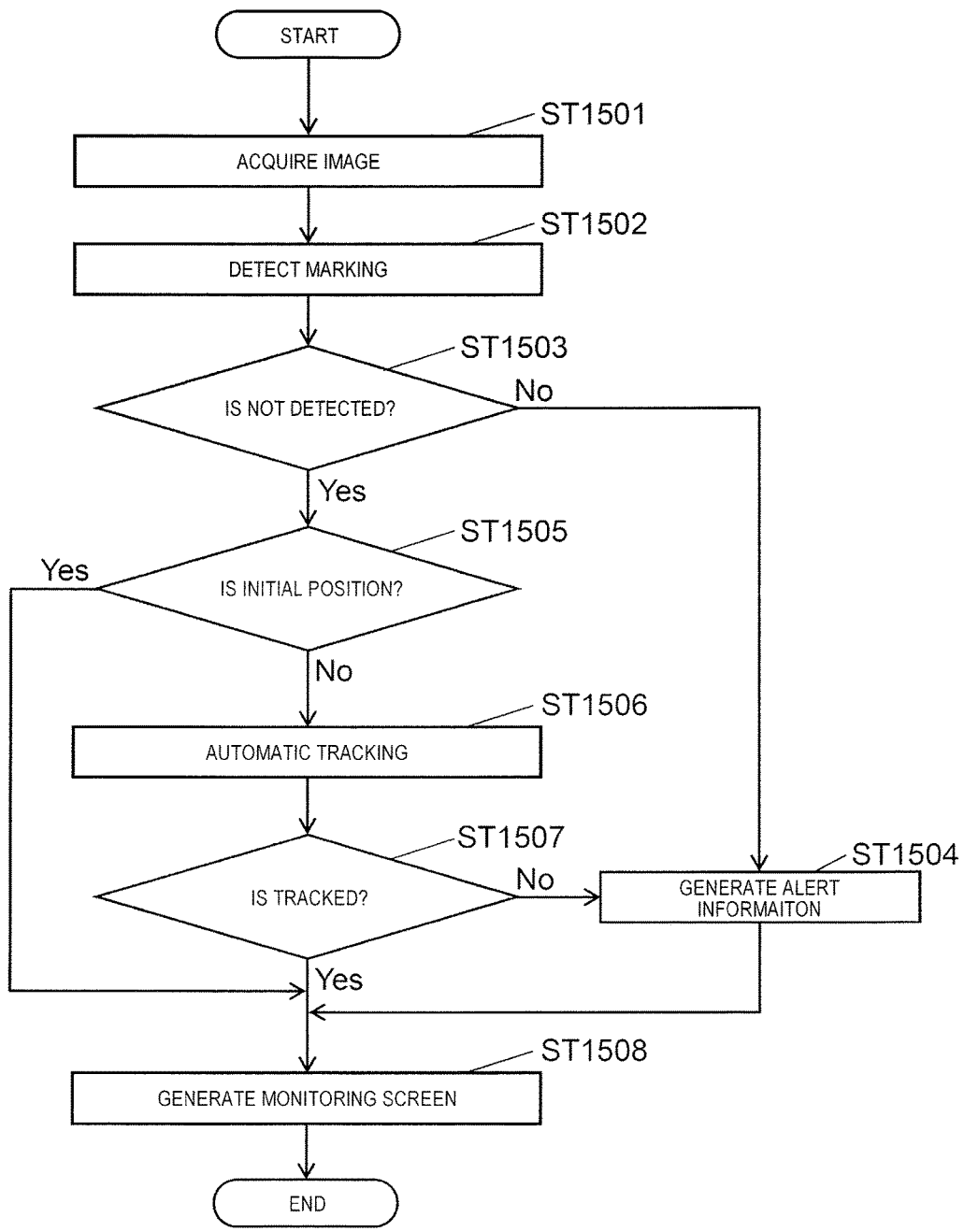
FIG. 15 is an operation flow diagram illustrating an operating procedure of automatic tracking according to the third embodiment.

FIG. 15 is an operation flow diagram illustrating an operating procedure of automatic tracking according to the third embodiment. In FIG. 15, PC 3 acquires captured images of the interior of a store from camera 1, by image acquirer 30 (ST1501). Next, marking detector 1301 searches for marking 141 (see FIG. 14) from the acquired image (ST1502). The marking image to be searched is stored in storage 38 in advance.

Next, all the markings (four in the case of FIG. 14) stored in storage 38 by processing condition setter 131 cannot be detected (No in ST1503), marking detector 1301 notifies alert notifier 34 that marking cannot be detected, and alert notifier 34 generates alert information (ST1504). The generated alert information is sent to display screen generator 35. Upon receipt of the alert information, display screen generator 35 generates an alert notification screen indicating that marking cannot be detected (ST 1508).

When all the markings 141 are detected (Yes in ST1503), it is determined whether or not all the detected marking position matches the initial marking position stored in storage 38 (ST1505). In a case where marking change decider 1302 determines that the marking positions do not match (No in ST1505), automatic tracker 111 controls the up, down, left and right photographing direction (angle of view) of camera 1 such that the marking position on the image overlaps with the initial marking position (ST 1506).

The position information of the detected marking and the position information of the initial marking may be notified from marking change decider 1302 to automatic tracker 111, and automatic tracker 111 may calculate the angle of view of the camera for returning the current marking position to the initial position based on both pieces of position information so as to control the camera. Alternatively, marking change decider 1302 may calculate the angle of view of the camera for returning the current marking position to the initial position and notify automatic tracker 111 of information on the angle of view, and automatic tracker 111 may control the camera according to the information on the angle of view.

Next, it is determined whether or not automatic tracking for changing the marking position on the image to the initial marking position has been performed by the control of camera 1 (ST1507). When automatic tracking cannot be performed (No in ST1507), automatic tracker 111 notifies alert notifier 34 that automatic tracking cannot be performed, and alert notifier 34 generates alert information (ST1504). The generated alert information is sent to display screen generator 35. Upon receipt of the alert information, display screen generator 35 generates an alert notification screen indicating that automatic tracking by the control of the camera cannot be performed (ST1508).

When the marking position matches the initial marking position in ST1505 (Yes in ST1505), or when automatic tracking is performed in ST1507 (Yes in ST1507), display screen generator 35 generates a monitoring screen for monitoring the display shelf. In this case, since goods detector 32 can recognize the area of the display shelf based on the marking position and detect goods, display screen generator 35 may display the goods detection result on the monitoring screen.

As described above, according to the third embodiment, a unique seal (marking) is attached to the display shelf in advance, this is recognized by the camera, and in a case where there is a difference between the initial position of marking and the marking position on the current image, the up, down, left and right photographing directions (angle of view) of the camera is controlled so as to match the initial position. Thus, even in a case where the display shelf is actually moved, or even in a case where the angle of view of the capturing camera has changed, the position of the display shelf can be accurately captured, and the monitoring will be continued without bothering the user.

In the third embodiment, the automatic tracking is performed by changing the photographing direction of the camera, but instead of changing the photographing direction of the camera, the latest position of the display shelf may be recognized based on the current marking position and goods may be detected from the latest position. In that case, automatic tracker 111 may inform goods detector 32 of the moved position of the display shelf. Thus, even in a case where the display shelf is moved in the image, it is possible to accurately detect goods from the moved display shelf, without troubling the user.

Although the present invention has been described based on a specific embodiment, these embodiments are merely examples, and the present invention is not limited by these embodiments. In addition, all the constituent elements of a monitoring device, a monitoring system, and a monitoring method according to the present invention described in the above embodiments are not necessarily indispensable, and can be selected as appropriate at least without departing from the scope of the present invention.

For example, in the present embodiment, a retail store such as a convenience store has been described as an example, but the present invention is not limited to such a retail store, but can also be applied to a store of a business type other than the retail store.

In the present embodiment, as illustrated in FIG. 2, an omnidirectional camera having a photographing range of 360 degrees using a fisheye lens is used as camera 1, but a camera having a predetermined angle of view, a so-called box camera may also be used.

In the present embodiment, the image at a setting time when the fixed area is set and the current image are displayed side by side on the alert notification screen as illustrated in FIG. 8, but in a case of obtaining a similarity between the image at a setting time and an image at the same time or the image at the same weather as that thereof, an image to be compared may be displayed. In addition, only the text may be displayed and the image may not displayed.

In the present embodiment, PC 3 installed in the store may be configured to execute the processes required for the monitoring, but as illustrated in FIG. 1, the required processes may be executed by PC 11 installed in the head office or cloud computer 21 constituting a cloud computing system. The required processes may be shared by a plurality of information processing devices, and information may be transferred between the plurality of information processing devices through a communication medium such as an IP network or a LAN. In this case, a monitoring system is configured with the plurality of information processing devices that share required processes.

With such a configuration, a device such as PC 3 installed in the store may be configured to execute at least a process having a large amount of data, for example, a goods detection process, among the processes required for the monitoring. With this configuration, since the data amount of the remaining processing can be reduced, even if the remaining processing is executed by an information processing apparatus installed at a location different from the store, for example, PC 11 installed in the head office, the communication load can be reduced, so that the operation of a system using a wide area network connection form becomes easy.

Cloud computer 21 may be configured to execute all required processes, or cloud computer 21 may be configured to share at least the screen output processing out of the required processes. With this configuration, mobile terminals such as smart phones 22 or tablet terminals 23 as well as PC 3 and 11 installed in the store and the head office can also display the monitoring screen, so that supervisors who are traveling through the store can monitor the opportunity loss cause at a remote store at any place such as a visiting place in addition to the store and the head office.

In the present embodiment, a description is made on the case where PC 3 installed in the store executes the processes required for the monitoring, the monitoring screen or the like is displayed on monitor 5 connected to PC 3, and required input and output are executed in PC 3, but the required input and output may be executed in an information processing device different from the information processing apparatus that executes the processes required for the monitoring, for example, PC 11 installed in the head office or mobile terminals such as smart phones 22 or tablet terminals 23.

INDUSTRIAL APPLICABILITY

In the monitoring device, the monitoring system, and the monitoring method according to the present invention, in a case where a change occurs in the monitoring environment such as that the position of the display shelf in the display area being monitored is moved, an obstacle is placed between the camera and the display shelf, and there is a shift in the position of the camera, it is possible to continue correctly monitoring the display status of goods, by promptly notifying the store staff member of the alert and returning the monitoring environment to a correct state. This leads to the effect of being able to implement monitoring of a display shelf which is stable over a long period of time, and is useful as a monitoring device, a monitoring system, a monitoring method, and the like for monitoring goods based on the images of stores.

REFERENCE MARKS IN THE DRAWINGS

1 CAMERA
2 RECORDER
3 MONITORING DEVICE (PC)
4 COMMUNICATION DEVICE
5 MONITOR
6 INPUT DEVICE
11 PC
21 CLOUD COMPUTER
22 SMART PHONE
23 TABLET TERMINAL
30 IMAGE ACQUIRER
31, 130 SHELF DETECTOR
311 SIMILARITY CALCULATOR
312 ENVIRONMENTAL CHANGE DETECTOR
32 GOODS DETECTOR
33 STATE DECIDER
34 ALERT NOTIFIER
35 DISPLAY SCREEN GENERATOR
36 OPERATION INPUT CONTROLLER
37 FIXED AREA SETTER
38 STORAGE
51, 52 FIXED AREA
72 IMAGE AT A SETTING TIME
103 CURRENT IMAGE
104, 105 FIXED AREA CORRESPONDING IMAGE
111 AUTOMATIC TRACKER
131 PROCESSING CONDITION SETTER
1301 MARKING DETECTOR
1302 MARKING CHANGE DECIDER
141 MARKING

The invention claimed is:

1. A monitoring device comprising:
a processor that:
sets an area of a part of a display shelf to be monitored as a fixed area, based on a captured image of the display shelf in a store, the fixed area being an area whose image is not to be changed over time;
stores the fixed area in the monitoring device;
determines a similarity between an image of the stored fixed area and an image at the same position as the fixed area in a captured image of the store;
detects that a position of the display shelf is changed in the captured image of the store, when it is determined that there is no similarity between the image of the fixed area and the image at the same position as the fixed area in the capture image of the store; and
notifies a user that the display shelf to be monitored is not detected, when it is detected that the position of the display shelf is changed.

2. The monitoring device of claim 1,
wherein the processor further:
extracts at least one area without a change over a predetermined period as at least one fixed area candidate, from the captured image of the store, and
sets a fixed area candidate selected by the user as the fixed area, from the extracted at least one fixed area candidate.

3. The monitoring device of claim 1,
wherein the processor stores position information of the fixed area, the captured image of the display shelf at a setting time, and an identifier of the display shelf, in a storage.

4. The monitoring device of claim 1,
wherein the processor
sets a plurality of areas as a plurality of fixed areas,
determines similarity between an image at each of the plurality of fixed areas and an image at the same position as each of the plurality of fixed areas, and
detects that the position of the display shelf is changed when it is determined that at least one of the plurality of fixed areas is not similar.

5. The monitoring device of claim 1,
wherein the processor determines similarity by comparing brightness of the image of the fixed area with brightness of the image at the same position as the fixed area in the captured image of the store.

6. The monitoring device of claim 1, wherein the processor
searches for a similar image, which is similar to the image of the fixed area, from the captured image of the store, when the processor determines that there is no similarity between the image of the fixed area and the image at the same position as the fixed area in the capture image of the store;
controls an angle of view of a camera which is capturing an image such that the position of the searched similar image is the position of the fixed area; and
notifies the user that the display shelf is not detected when the similar image cannot be searched.

7. The monitoring device of claim 1, the processor further detects goods from the display shelf; and
generates a monitoring screen for displaying a detection result of goods and the captured image of the display shelf on a monitor.

8. The monitoring device of claim 1, wherein the fixed area includes only a frame of the display shelf.

9. The monitoring device of claim 1, wherein the fixed area includes only a structural component of the display shelf and excludes the goods on the display shelf.

10. The monitoring device of claim 9, wherein the processor excludes the goods from the fixed area by extracting an area without a change over a predetermined period as a fixed area candidate, from the captured image of the store.

11. The monitoring device of claim 1, wherein the processor further
detects that the position of the display shelf is not changed in the captured image of the store, when it is determined that there is similarity between the image of the fixed area and the image at the same position as the fixed area in the captured image of the store;

detects goods displayed on the display shelf when it is detected that the position of the display shelf is not changed; and determines whether or not there is a deficiency in the detected goods displayed on the display.

12. A monitoring system which monitors a display shelf, based on a captured image of the display shelf in a store, comprising:

a camera that captures an image of the display shelf; and an information processing device including a processor, wherein the processor sets an area of a part of the display shelf to be monitored as a fixed area, based on a captured image of the display shelf in the store, the fixed area being an area whose image is not to be changed over time;

stores the fixed area in the monitoring device;

determines a similarity between an image of the fixed area and an image at the same position as the fixed area in a captured image of the store;

detects that a position of the display shelf is changed in the captured image of the store, when it is determined that there is no similarity between the image of the fixed area and the image at the same position as the fixed area in the capture image of the store; and notifies a user that the display shelf to be monitored is not detected, when it is detected that the position of the display shelf is changed.

13. The monitoring system of claim 12, wherein the processor further detects that the position of the display shelf is not changed in the captured image of the store, when it is determined that there is similarity between the image of the fixed area and the image at the same position as the fixed area in the captured image of the store;

detects goods displayed on the display shelf when it is detected that the position of the display shelf is not changed; and determines whether or not there is a deficiency in the detected goods displayed on the display.

14. A monitoring method causing a processor of an information processing device to implement a process of monitoring a display shelf, based on a captured image of the display shelf in a store, the method comprising:

setting an area of a part of the display shelf to be monitored as a fixed area, from the captured image of the display shelf, the fixed area being an area whose image is not to be changed over time;

storing the fixed area in a monitoring device;

determining a similarity between an image of the stored fixed area and an image at the same position as the fixed area in a captured image of the store;

detecting that a position of the display shelf is changed in the captured image of the store, when it is determined that there is no similarity between the image of the fixed area and the image at the same position as the fixed area in the capture image of the store; and notifying a user that the display shelf to be monitored is not detected, when it is detected that the position of the display shelf is changed.

15. The monitoring method of claim 14, further comprising:

detecting that the position of the display shelf is not changed in the captured image of the store, when it is determined that there is similarity between the image of the fixed area and the image at the same position as the fixed area in the captured image of the store;

detects goods displayed on the display shelf when it is detected that the position of the display shelf is not changed; and determining whether or not there is a deficiency in the detected goods displayed on the display.

16. A monitoring device comprising:

a processor that:

detects a display shelf, by searching for a marking image which is attached to the display shelf and is uniquely identifiable, from a captured image of the display shelf in a store, and determining whether or not a position of the searched marking image matches an initial position of the marking image which is stored in advance;

controls an angle of view of a camera which is capturing an image such that the position of the marking image is the initial position, when it is determined that the position of the marking image does not match the initial position; and notifies a user that the display shelf is not detected, when the marking image cannot be searched.

* * * * *